United States Patent [19]
Shoupp et al.

[11] 3,840,297
[45] Oct. 8, 1974

[54] COLLAPSIBLE INSTANT-PHOTOGRAPHIC CAMERA HAVING AN INTEGRAL MECHANICALLY-POWERED ELECTRIC GENERATOR

[76] Inventors: William E. Shoupp, 343 Maple Ave., Pittsburgh, Pa. 15218; Walter V. Bratkowski, 3314 Idaho Ave., McKeesport, Pa. 15132

[22] Filed: July 17, 1973

[21] Appl. No.: 380,179

[52] U.S. Cl. .................................. 354/135, 310/14
[51] Int. Cl. ............................................ G03b 15/03
[58] Field of Search ............... 95/11 L, 11 R, 11.5; 310/12–15; 335/222, 229, 238, 253; 354/135

[56] References Cited
UNITED STATES PATENTS

| | | | |
|---|---|---|---|
| 2,542,164 | 2/1951 | Tatro | 95/11.5 R |
| 3,091,725 | 5/1963 | Huston | 335/253 X |
| 3,132,522 | 5/1964 | Goldfarb | 310/15 UX |
| 3,398,302 | 8/1968 | Harnau et al. | 310/14 |
| 3,419,739 | 12/1968 | Clements | 310/12 X |
| 3,461,806 | 8/1969 | Barthalon | 310/36 UX |
| 3,500,086 | 3/1970 | Baermann | 310/15 X |
| 3,672,813 | 6/1972 | Horton | 95/11.5 R X |
| 3,693,033 | 9/1972 | Troesh | 310/14 |
| 3,709,118 | 1/1973 | Shoupp et al. | 95/11.5 R |
| 3,709,122 | 1/1973 | Blinow et al. | 95/11 R |

*Primary Examiner*—Samuel S. Matthews
*Assistant Examiner*—Kenneth C. Hutchinson
*Attorney, Agent, or Firm*—D. S. Buleza

[57] ABSTRACT

The electrical energy for firing a photoflash lamp and/or operating the logic circuit, shutter speed, "f" stop control and other components of a collapsible instant-photographic camera is derived from an electric generator that is located within the camera and replaces the battery normally employed for this purpose. The generator has a spring-loaded armature that is cocked by the film-indexing mechanism and is triggered by the button which is pressed to snap the picture. The generator is tailored to physically replace the high-speed electric motor employed in the "SX-70" Land camera presently being marketed by the Polaroid Corporation and functionally replaces the battery which is included as an integral part of each of the film cassettes used in such cameras. The elimination of the integral battery permits the film units in each cassette to be increased from 10 to 12. The exposed film-units are indexed into and through the processing rollers by a manually-actuated gear train and the electric generator is so designed and located within the camera that it is cocked and tripped without interfering with the operation of any of the camera components or mechanisms, or with the picture-taking and developing operations.

18 Claims, 17 Drawing Figures

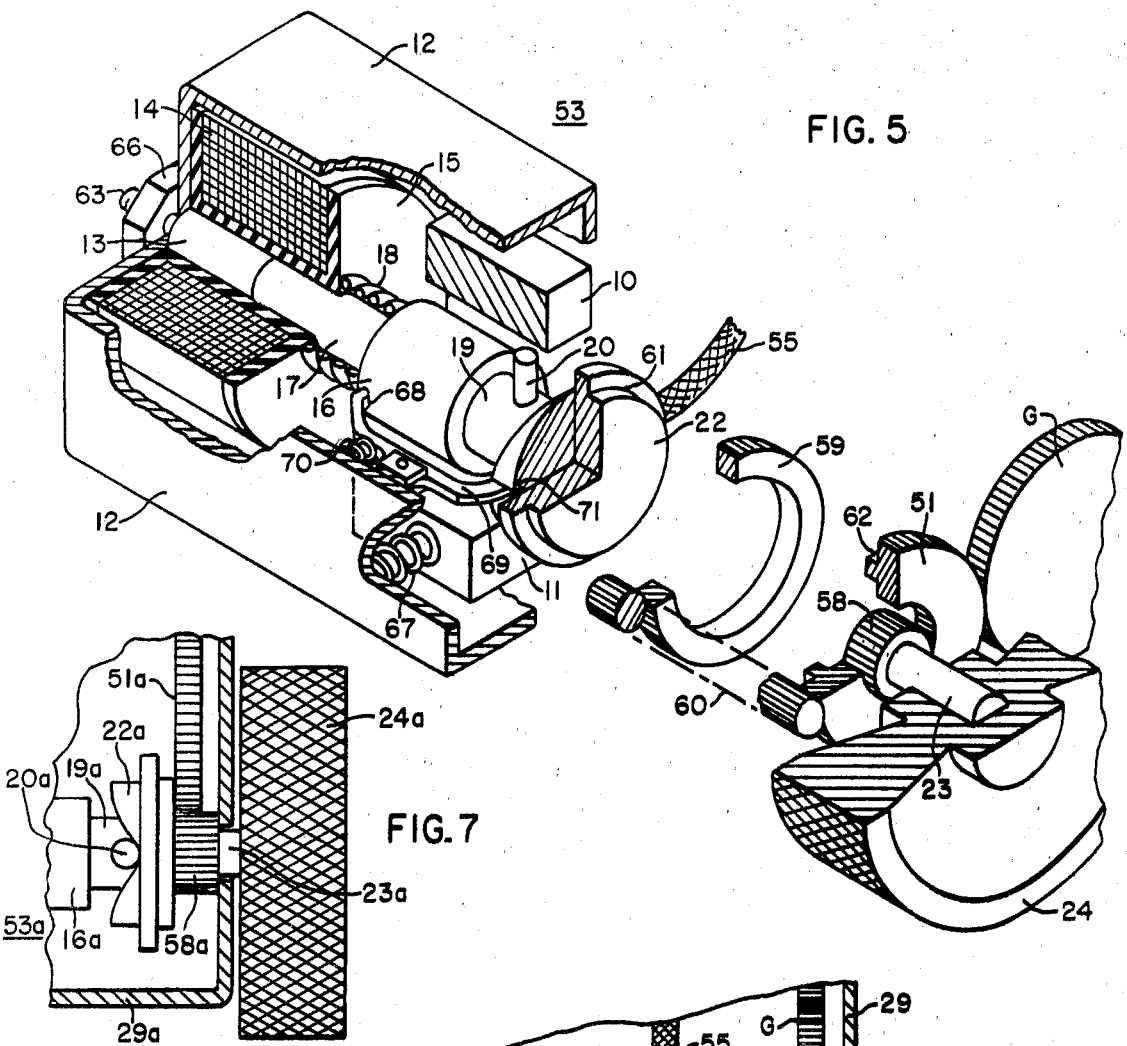
FIG. 5
FIG. 7
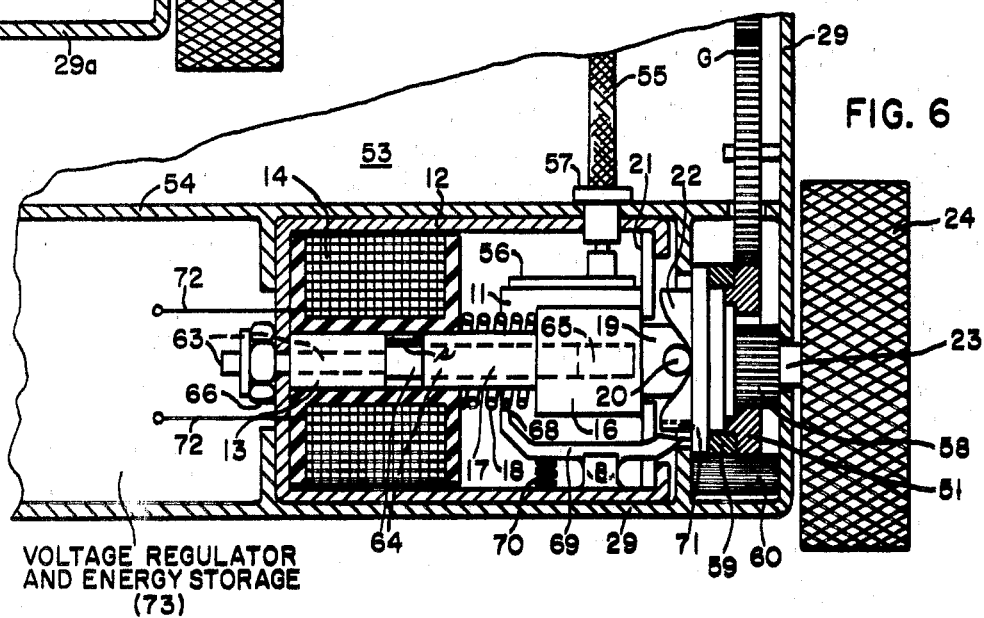
FIG. 6
VOLTAGE REGULATOR AND ENERGY STORAGE (73)

COLLAPSIBLE INSTANT-PHOTOGRAPHIC CAMERA HAVING AN INTEGRAL MECHANICALLY-POWERED ELECTRIC GENERATOR

CROSS-REFERENCES TO RELATED APPLICATIONS

The subject matter of this application is related to that disclosed and claimed in application Ser. No. 380178 of W. E. Shoupp, W. V. Bratkowski and D. J. Boomgaard; application Ser. No. 380,180 of the present inventors; and application Ser. No. 380,181 of W. E. Shoupp, W. V. Bratkowski and J. N. Esposito, which applications are filed concurrently with the present application and are assigned to the same assignee.

BACKGROUND OF THE INVENTION

1. Field of the Invention:

This invention generally relates to photographic cameras and has particular reference to an improved instant-photographic camera that is collapsible into pocket-carrying size and includes an integral mechanically-powered electric generator that is automatically actuated and reset during the normal sequence of operations required to take a picture and develop it.

2. Description of the Prior art:

Photographic cameras having mechanically tripped and powered devices that generate electrical energy for firing photoflash lamps or operating other devices in a camera are known in the art. A camera having such an electric generator wherein a voltage pulse is produced by a flat coil of wire that is attached to the camera shutter and propelled into the gap of a permanent magnet when the shutter is tripped is disclosed and claimed in U.S. Pat. No. 3,709,118 issued Jan. 9, 1973 to the present inventors. The "built-in" electric generator replaces the battery normally employed in the camera and thus eliminates the problems encountered in firing a photoflash lamp when the batteries become weak or dead or the battery contacts become dirty or oxidized.

A camera having a flap-type shutter with a permanent magnet that enters a stationary wire coil when the shutter is actuated and thus generates a voltage pulse which "fires" a thyratron tube in an external electrical circuit which flashes a gaseous discharge lamp is described in U.S. Pat. No. 2,538,577 issued Jan. 16, 1951 to C. W. McCarty. A camera having a magnetic circuit with an oscillating core element which generates a voltage and fires a photoflash lamp when the shutter is actuated is disclosed in U.S. Pat. No. 3,480,808 issued Nov. 25, 1969 to H. F. Rieth. A camera shutter and electric generator assembly wherein the voltage is produced by a rotor that is rotated when the shutter is actuated is disclosed in U.S. Pat. No. 3,703,132, issued Nov. 21, 1972 to D. E. Beach.

Various other types of electric generators that produce a voltage in response to changes in the flux density or flux distribution in a magnetic circuit are disclosed in U.S. Pat. Nos. 2,426,322; 2,784,327; 2,904,707; 3,065,366; and 3,500,086.

Camera flashguns having an integral electric generator consisting of a permanent magnet and a pivoted armature that is manually actuated by a shutter-release cable or powered by a leaf spring are disclosed in U.S. Pat. Nos. Re. 22,433; 2,448,897 and 2,490,225.

Collapsible instant-photographic cameras are also well known in the art. A fully automatic single-lens reflex camera that is foldable into thin compact size suited for convenient carrying in a pocket of the photographer is disclosed in U.S. Pat. No. 3,714,879 issued Feb. 6, 1973 to Edwin H. Land, et al. Motive power for such cameras is derived from a high-speed electric motor that is energized by a battery which constitutes part of the film cassette that is inserted into the base portion of the camera. Cameras of this type are known in the art as "SX-70" Land cameras and are presently being marketed by the Polaroid Corporation. The various components and features of such cameras and the new instant-developing film which they employ are described in the January 1973 issue of "Popular Science" magazine (pages 84–87 and 114).

In view of the added cost of the disposable battery and the potential problems of weak or dead cells and dirty contacts traditionally associated with the use of batteries in cameras, it would be very desirable from both an economical and operational standpoint to provide a compact collapsible instant-photographic camera of the aforesaid type that can be operated and will also take flash pictures without the need of a battery that is associated with either the camera per se or with the film pack or cassette which is inserted into the camera.

SUMMARY OF THE INVENTION

The foregoing objectives and other advantages are achieved in accordance with the present invention by replacing the battery and electric motor now employed in a conventional "SX-70" Land camera with a small powerful electric generator that is automatically cocked and triggered when the camera is indexed through one cycle of operations required to snap a photograph and then process an eject the exposed film from the camera. The generator is located in the space within the camera housing occupied by the electric motor in a conventional camera and has a spring-loaded armature that is reciprocally moved a very short distance and produces the desired electrical potential by rapidly changing the flux in a magnetic circuit that is inductively coupled to a wire coil.

The electric generator supplies sufficient energy to operate the solid-state logic circuit components used in the "SX-70" Land camera as well as the automatic 37 f" stop control, shutter speed control and other electrical devices that are built into such cameras. The gear-train mechanism which pushes the exposed film unit through the processing rollers is manually operated by a knob that also cocks the electric generator for the next picture-taking cycle. The elimination of the integral battery from the film cassette permits two additional film units to be added to the tenunit pack now employed in the cassettes used in such cameras. The generator also supplies sufficient energy to fire a selected photoflash lamp in a multi-flash unit that is mounted on the camera.

BRIEF DESCRIPTION OF THE DRAWINGS

A better understanding of the invention will be obtained from the exemplary embodiments shown in the accompanying drawings, wherein:

FIG. 5 is an exploded view, on an enlarged scale and partly in section, of the electric generator and gear and slip clutch coupling arrangement employed in the camera shown in FIG. 4;

FIG. 6 is a plan view, partly in section of the generator and coupled gear and slip-clutch components shown in FIG. 5;

FIG. 7 is a fragmentary plan view of an alternative generator-cocking and film-advancing mechanism;

DESCRIPTION OF THE PREFERRED EMBODIMENTS

Figure 1:
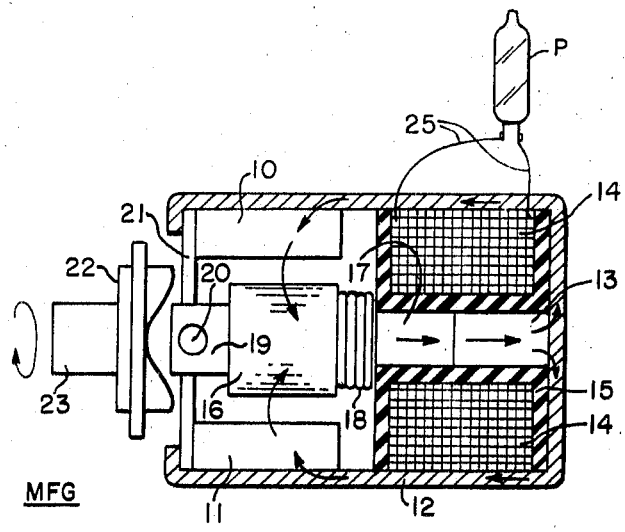
FIG. 1 is a simplified elevational view, partly in section, of a cocked magnetic-flux generator according to the invention.

In FIG. 1 there is shown a magnetic flux generator (MFG) which illustrates the basic concept of electrical power generation utilized in the invention. As shown, the generator consists of a pair of spaced permanent magnets 10 and 11 that are aligned with one another and secured to a metal casing 12 of generally cylindrical configuration that has a pole piece 13 secured to and axially-extending from its end wall. Pole piece 13 is also of cylindrical configuration and is located within an annular coil 14 of fine insulated wire that is wound about a suitable bobbin 15 of non-magnetic material such as plastic. A reciprocally-movable armature 16 is disposed at the other end of casing 12 and has two depending arms 17 and 19. Arm 17 is slidingly nested within the opening of bobbin 15 and arm 19 has a protruding pin 20 and rides within a suitably shaped hole in an end plate 21 that is fastened to casing 12 and magnets 10 and 11.

A coil spring 18 (shown in compressed condition) is located on armature arm 17 and interposed between the bobbin 15 and the enlarged central part of the armature 16. A cam 22 having a central recess adapted to receive the end of armature arm 19 is supported outside the casing 12 by suitable means (not shown) and has a cam surface that is arranged to engage the pin 20. A depending shaft 23 permits cam 22 to be rotated, as indicated by the arrow. The wire winding comprising coil 14 is connected by suitable conductors 25 to a photoflash lamp P.

The magnetic flux generator MFG is shown in cocked position in FIG. 1. In this position the armature arm 17 is in abutting engagement with the pole piece 13, thus consituting a magnetic circuit (indicated by the series of arrows) which extends through the arm 17, the abutting pole piece 13, the end wall and side walls of the metal casing 12, into permanent magnets 10, 11 and then into the central portion of the armature 16 through the small air gaps. The magnetic attractive force exerted on armature 16 by pole piece 13 is so correlated relative to the stiffness of the spring 18 that the latter, when in compressed condition as shown in FIG. 1, is unable to push the armature 16 away from the pole piece 13. The spring 18 thus serves as a means for storing mechanical energy which permits the generator MFG to be cocked and remain in such condition until tripped.

Figure 2:
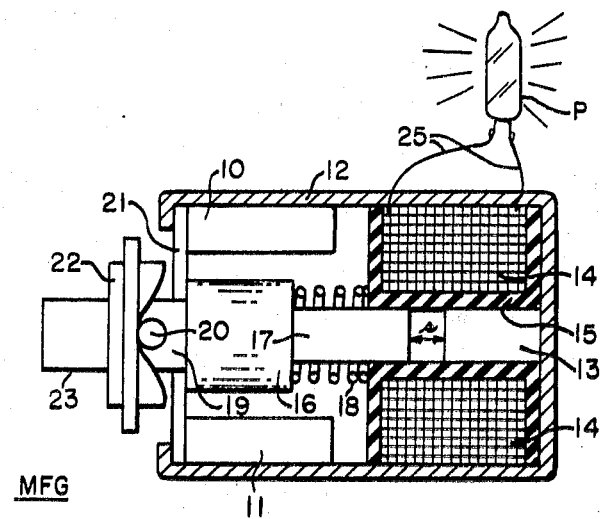
FIG. 2 is a similar view of the generator after it has been tripped and fired a photoflash lamp.

Tripping of the electric generator MFG is accomplished by altering the magnetic circuit so that the magnetic pull on armature 16 is weakened sufficiently to enable the compressed spring 18 to propel the armature 16 in the axial direction — thus providing a snap action. Such altering of the magnetic circuit is achieved by moving one of the permanent magnets 10, 11 from its original aligned position relative to the armature 16, thus increasing the air gap and producing the required reduction in the strength of the magnetic field. As soon as this occurs, the spring 18 snaps the armatue 16 outwardly and pin 20 engages the depressed portion on the curved surface of the cam 22, as shown in FIG. 2. The resulting rapid collapse of the magnetic flux causes coil 14 to generate a voltage pulse which is delivered to the photoflash lamp P by the conductors 25 and fires the lamp so that it produces a flash of light, as shown. The generator MFG is then in condition to be recocked, which operation is accomplished by returning the displaced permanent magnet to its original aligned position with the armature 16 and the other magnet. This causes pin 20 to ride up the elevated portion of the arcuate surface of cam 22 and pushes the armature 16 into abutting magnetically-locked relationship with the pole piece 13 against the action of spring 18 (see FIG. 1).

As will be noted in FIG. 2, the spacing "s" between pole piece 13 and arm 17 of the armature 16 (when the latter is in uncocked or tripped position) is just slightly larger than the axial movement of the armature 16 effected by the interaction of the pin 20 and arcuate surface of the cam 22. The total distance travelled by armature 16 when cocked is in the order of about ⅛ of an inch (3.175 mm.).

Figure 3:
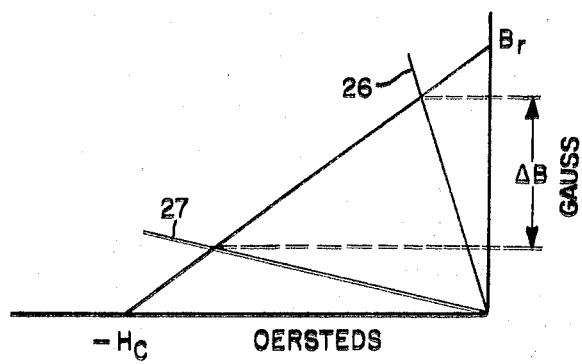
FIG. 3 is a graph depicting a typical demagnetization curve and permeance lines for the magnetic flux generator shown in FIGS. 1 and 2.

In the closed circuit or cocked position the permanent magent operating point is shown as permeance line 26 in the demagnetization curve illustrated in FIG. 3. When the armature 16 is tripped, the flux collapses in the magnetic circuit and the operating point of the permanent magnets 10, 11 is at permeance line 27 shown in the graph. The flux through or linking the coil 14 is thus changed by $\Delta B$ in a given time $\Delta t$. This change in flux induces a voltage in the coil 14 which is used to electrically power the camera (as hereinafter described) and is defined by the following mathematical relationship:

$$V = -Nd\phi/dt = -NA\, DB/dt \text{ (volts)}$$

where:
B = Flux Density in Gauss
N = Number of Turns in the Coil
A = Pole face area $$dB/dt = \lim_{\Delta t \to 0} \frac{\Delta B}{\Delta t}$$

Figure 4:
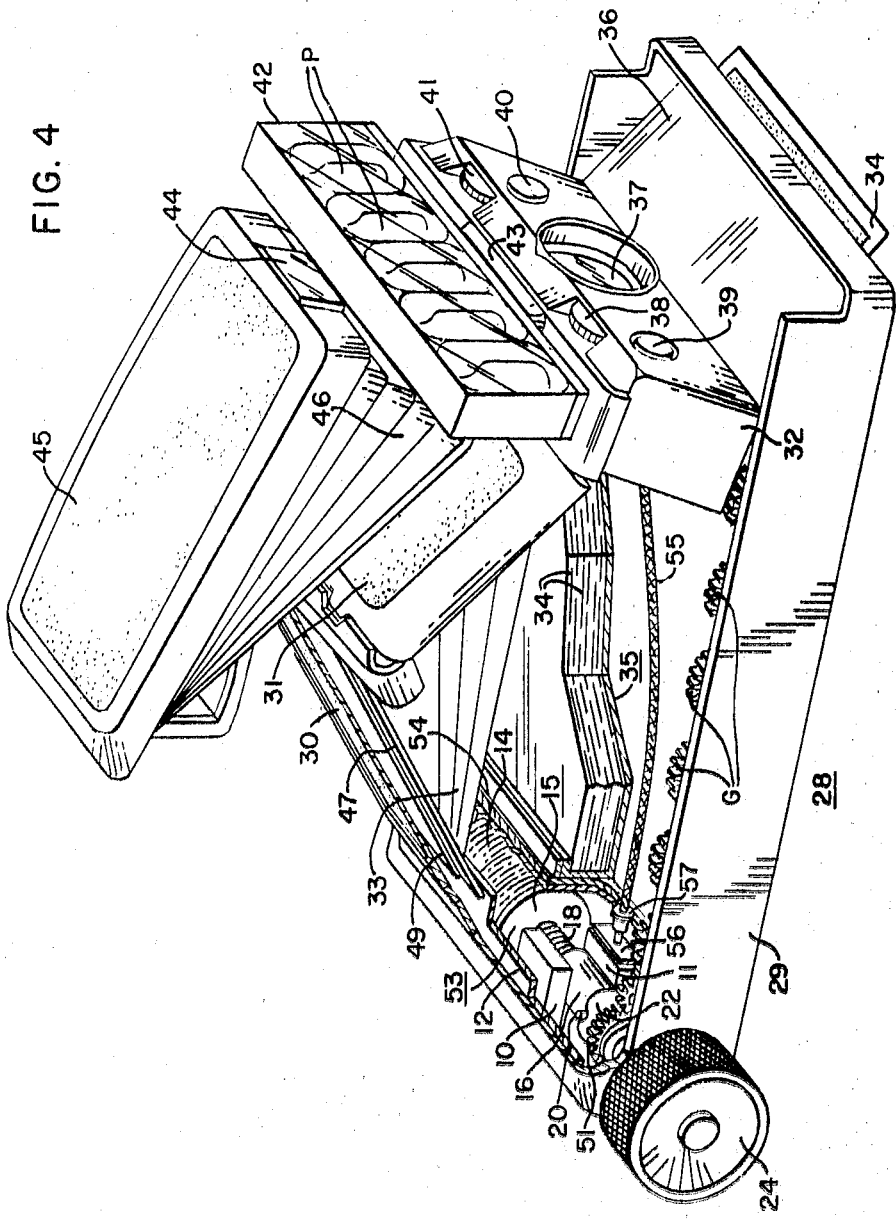
FIG. 4 is a pictorial view of a modified "SX-70" Land camera that embodies the invention and is fitted with a "FlashBar" lamp unit.

In FIG. 4 there is shown an "SX-70" Land camera 28 that has been modified in accordance with the present invention to include a magnetic flux generator of the type just described, which generator replaces the electric motor and filmpack battery previously used in conventional cameras of this type. The electric generator is indicated by the general reference numeral 53 and is located in the space at the rear of the camera normally occupied by the high-speed electric motor. The camera 28 is shown in its extended condition and generally comprises a base portion 29, a rear panel 30, a forward panel 31 and an exposure-control housing 32 that are hinged to each other in such a manner that the camera can be locked in the extended position shown and collapsed into compact rectangular shape by linkage means (not shown) in accordance with the teachings of the aforementioned U.S. Pat. No. 3,714,879.

The rear panel 30 and forward panel 31 are connected by bellows 33 (only a portion of which is shown in FIG. 4) that provides a light-tight chamber for sequentially exposing film units 34 in cassette 35 that is loaded into the base portion 29 of the camera 28. As the film units 34 are exposed, they are pushed by a suitable pick means within the camera (not shown) through a pair of processing rollers (elements 52 in FIG. 8) located near the front of the camera and are ejected through an opening located beneath a front panel 36 in the usual fashion. The exposure-control housing 32 contains a lens 37, focusing means which is controlled by a knob 38, a push-button 39 that starts the picture-taking operation, a suitable photocell 40 for measuring the ambient light conditions and adjusting the film exposure, and a knob 41 for varying the darkness and lightness of the developed picture in accordance with the instructions provided on the film cassette 35. The lens 37 is of the four-element type with a movable element, as disclosed in the aforementioned "Popular Science" article. Such a lens is described in Canadian Pat. No. 925,731 issued May 8, 1973 to J. G. Baker.

As shown in FIG. 4, the camera 28 is provided with a multiflash unit 42 that is inserted into a socket 43 located on the top of the exposure-control housing 32 and contains a plurality of photflash lamps P that are arranged in side-by-side planar array and face toward the scene being photographed. The multiflash unit 42 here shown is a 10-lamp unit known in the art as the "FlashBar" flash array and marketed by the General Electric Company for the "SX-70" Land camera. The "FlashBar" lamp unit is described in detail in U.S. Pat Nos. 3,598,984; 3,598,985 and 3,609,332.

In contrast to a conventional "SX-70" Land camera that has a single-lens reflex viewing system which utilizes a movable mirror component that converts the camera from a viewing mode to an exposure mode, the improved camera 28 of the present invention employs a conventional type view finder 44 and a stationary mirror 47. The view finder 44 is housed within a cap 45 that is hinged to the forward panel 31 and is collapsible therewith by means of bellows 46. Camera 28 thus exposes the film units 34 by light rays that pass through the lens 37 and strike the stationary mirror 47 that is secured to the inner surface of the rear panel 31 by a holder 49 and directs the light onto the surface of the film unit 34 located at the bottom of the camera.

Figure 8:
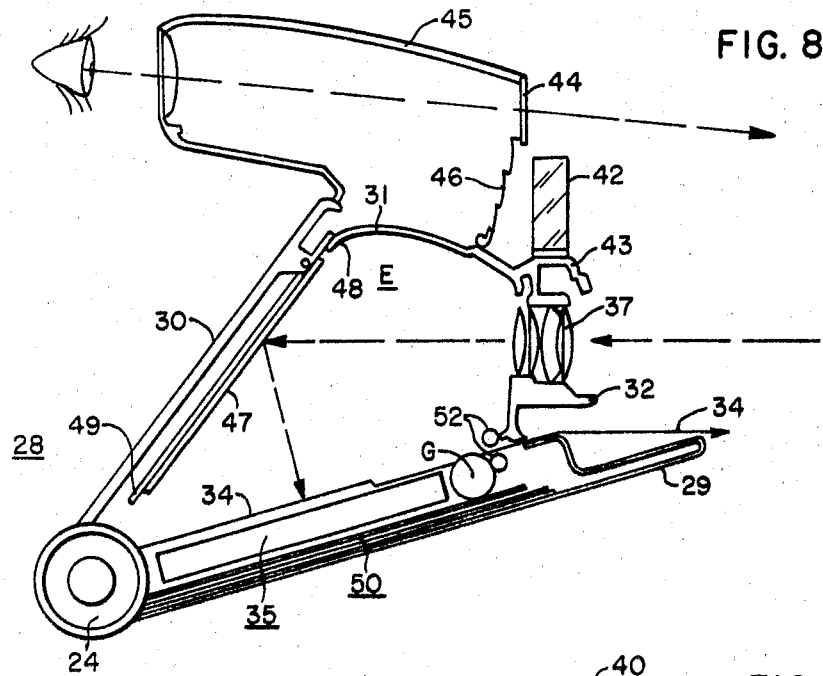
FIG. 8 is a schematic representation of the camera shown in FIG. 4.

A clearer understanding of the operation of the improved camera 28 of this invention will be obtained from the schematic representation shown in FIG. 8. As there illustrated, the scene to be photographed is viewed by looking through the eyepiece of the viewer 44 located in the cap 45 of the camera housing. The light from the scene being photographed, when the shutter is actuated, passes through the four-element lens 37, into the exposure chamber E defined by the extended camera housing, strikes the stationary mirror 47 and is reflected downwardly onto the uppermost film unit 34 in the film cassette 35 located in the base portion 29 of the camera. The exposed film unit 34 is then advanced by a manually-rotated knob 24 and a coupled gear train G (hereinafter described) to and through a pair of processing rollers 52 and is ejected from the front of the camera 28 through a suitable slot opening located beneath the exposure-control housing. As will be noted, the integrity of the exposure chamber E is preserved by a flexible flap 48 on the end of the forward panel 31 which seats against the holder 49 upon which the mirror 47 is mounted. The "FlashBar" lamp unit 42 is so located that it does not obstruct the view finder 44. The operation of the shutter speed and "f" stop components located within housing 32 is monitored and controlled by a solid-state logic circuit or electronic control unit 50 that is located at the bottom of the base 29 and operates in the manner described in U.S. Pat. No. 3,714,879 referred to previously.

Returning to FIG. 4, advancement of the exposed film unit 34 into the processing rollers 52 (and thence out of the camera 28) is achieved in accordance with the present invention by manually actuating the gear train G located within the base portion 29 of the camera housing. This is achieved by a knob 24 located at the rear of the camera 28, which knob turns a drive gear 51 which meshes with the first gear in the gear train G. Rotation of knob 24 also cocks the magnetic flux generator 53. The latter is tripped by pressing button 39 which is coupled by a cable 55 to a plate 56 secured to the movable permanent magnet 11. The cable 55 is fastened to the casing 12 of the generator 53 by a suitable bushing 57, as shown.

A more detailed illustration of the film-indexing and generator-cocking mechanism is shown in FIGS. 5 and 6 and will now be described. As will be noted, the knob 24 is fastened to the shaft 23 of the generator 53, which shaft has a small drive gear 58 on its free end that meshes with annular drive gear 51. The teeth on the outer periphery of drive gear 51 engage the first gear in the gear train G and thus operates the gear train in the manner described in the aforementioned U.S. Pat. No. 3,714,879. Rotation of the knob 24, accordingly, activates the gear train G and the latter actuates the film-indexing mechanisms (not shown) that push the exposed film unit 34 through the processing rollers 52 and out of the camera 28 in the manner described in the aforesaid patent.

To reduce the number of turns required to index a film unit 34 through the rollers 52 and out of the camera 28, the small drive gear 58 can be omitted and drive gear 51 fastened directly to shaft 23.

Rotation of knob 24 also rotates another annular gear 59 through a pinion gear 60 that meshes with the teeth on the outer periphery of drive gear 51. Annular gear 59 snugly fits within an annular race 61 provided in the end face of cam 22 and within a similar race 62 that is provided in the proximate face of the drive gear 51 and thus provides a slip-clutch arrangement that causes the cam 22 to rotate along with knob 24 and intermeshed gear system as long as the cam is free to move and is in frictional engagement with gear 59.

As shown in FIG. 5 (and more particularly in FIG. 6), the pole piece 13 is fastened to the end wall of the casing 12 by a bolt 63 which has a larger-diameter and segment 64 that slidingly fits within a cylindrical bore 65 provided within the armature 16. Bolt segment 64 thus serves as a pin guide that permits the armature 16 to move in an axial direction when the generator is cocked or tripped. The bolt 63 is fastened to the casing 12 by a lock nut 66.

The generator 53 is shown in its cocked position in FIG. 5 and in its uncocked position in FIG. 6. In the latter Figure there is, accordingly, a spacing "s" between the pole piece 13 and the armature arm 17 and the pin 20 is located at the low or "dwell" point of the cam 22. The generator 53 has thus been tripped and has produced a voltage pulse in wire coil 14, which pulse is delivered by conductors 72 to a voltage regulator and energy storage component 73 located in an adjacent compartment of the camera defined by a partition 54.

With the generator 53 in tripped condition (FIG. 6), rotation of the knob 24 causes the above-described intermeshing gear system and slip clutch arrangement to rotate cam 22 and push the pin 20 and armature 16 toward the pole piece 13 until the armature arm 17 is magnetically captured and locked in abutting relationship with the pole piece 13 (as shown in FIG. 5). When this occurs, the rounded end 68 of a lever 69 that is pivotally coupled to the casing 12 is engaged by the central portion of the armature 16 and is pushed against the side thereof by a spring 70 interposed between the lever 69 and adjacent wall of the casing. This causes the lever 69 to swivel so that its opposite end slips into a notch 71 located in the periphery of the cam 22 — thus locking the cam 22 in a position such that its low or "dwell" point is aligned with the pin 20 when the generator 53 is in cocked position (as shown in FIG. 5). The action of the slip-clutch arrangement permits rotation of the knob 24 to be continued without producing further rotation of the cam 22. Knob 24 can, accordingly, be turned the required number of times to actuate the gear train G and propel the exposed film unit through the processing rollers and out of the camera.

The generator 53 is thus automatically cocked and oriented for subsequent tripping when the knob 24 is continuously rotated through one film-indexing and developing cycle.

As shown in FIG. 5, permanent magnet 11 is movable laterally with respect to the armature 16 against the action of a spring 67 that is interposed between magnet 11 and the casing 12. Spring 67 thus automatically returns magnet 11, plate 56, cable 55 and camera button 39 to their original positions when the button is released.

The magnetic flux generator 53 is very compact and easily fits into the compartment at the rear of the camera housing 29 normally occupied by the high-speed electric motor in the conventional "SX-70" Land camera. Prototype designs of the generator 53 have shown that a voltage pulse many times greater than that required to reliably fire a photoflash lamp of the type used in a flashcube can be generated with an armature 16 that moves approximately ⅛ of an inch when the generator is tripped, and that reliable tripping can be achieved by moving the permanent magnet 11 a distance of approximately the same order.

In FIG. 7 an alternative arrangement is shown for indexing the exposed film units through the processing rollers and out of the camera. According to this embodiment the slip-clutch arrangement is omitted and knob 24a and its gear 58a are directly coupled to the cam 22a and the drive gear 51a. The correlation of the gear ratios is such that, after a predetermined number of turns of the control knob 24a that are sufficient to process and eject the exposed film unit out of the camera, the cycle phase switch associated with the ram and cam which are coupled to the gear train in the conventional "SX-70" Land camera described in U.S. Pat. No. 3,714,879 (switch 270, ram 250 and cam 252 in said patent) is actuated to lock the gear train G in a position such that the electric generator 53a is cocked with the pin 20a of the armature 16a in the proper alignment with the dwell point of the cam 22a.

Figure 9:
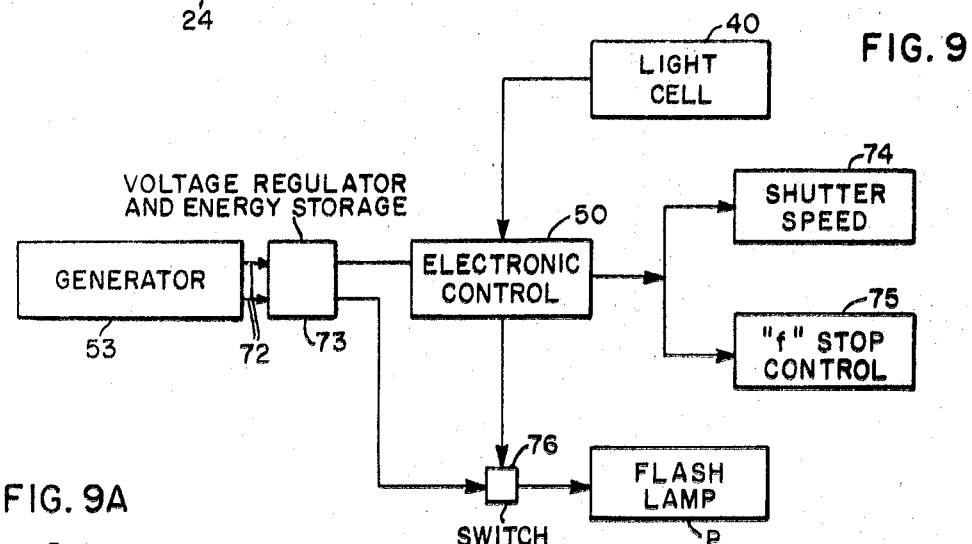
FIG. 9 is a block diagram showing the various electrical components employed in the camera shown in FIGS. 4 and 8 and the manner in which they are energized by the electric generator.

A schematic representation of the electrical devices and circuit employed in the camera 28 is shown in FIG. 9. As indicated, the output of the magnetic flux generator 53 of the present invention is fed into a voltage regulator and energy storage component 73 which converts the short voltage pulse into a voltage of smaller magnitude but longer duration. This modified voltage is fed into the electronic control component 50 of the camera, together with the output of the silicon light cell 40, so that the control circuit 50 energizes the shutter speed and "f" stop control components 74 and 75, respectively, in the manner described in the aforesaid U.S. Pat. No. 3,714,879. The output of the voltage regulator and energy storage component 73 is also fed into a switch 76 which, when closed, connects the generator 53 to a flashlamp P and causes it to fire in synchronized fashion with the opening of the shutter when indoor pictures are being taken. Switch 76 is located on a suitable part of the camera 28 so that it can be conveniently operated to cut the lamp P in and out of the circuit, as desired.

Figure 9A:
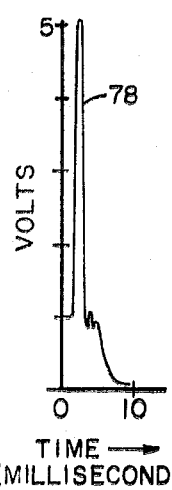
FIGS. 9a and 9b are graphs depicting the voltage pulses produced by the electric generator and the voltage regular component of the aforementioned camera, respectively, in accordance with the invention.
Figure 9B:
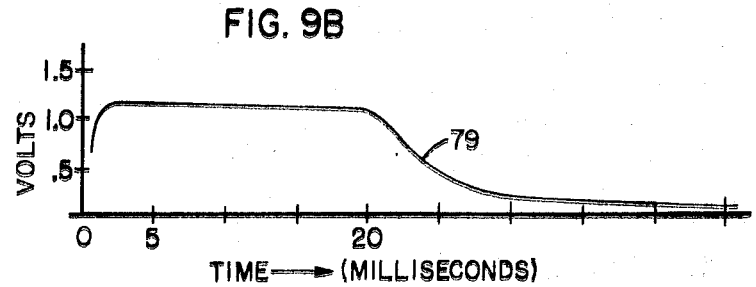

A typical voltage pulse 78, as shown in FIG. 9a, produced by one prototype design of the generator 53 peaks sharply at around 5 volts and lasts for approximately 8 to 10 milliseconds. The voltage regulator and energy storage circuit 73 converts this short voltage pulse into a pulse that is maintained at a value of approximately 1.3, volts for approximately 20 milliseconds, as shown by curve 79 of FIG. 9b. The aforementioned voltage regulator and energy storage circuit is described in detail in the aforementioned concurrently-filed application Ser. No. 380,178, which application also discloses a dynamic "f" stop control system that can be used in camera 28. Voltages and energies of greater magnitude can be readily obtained by using different permanent magnet stucture and coil designs.

Figure 10:
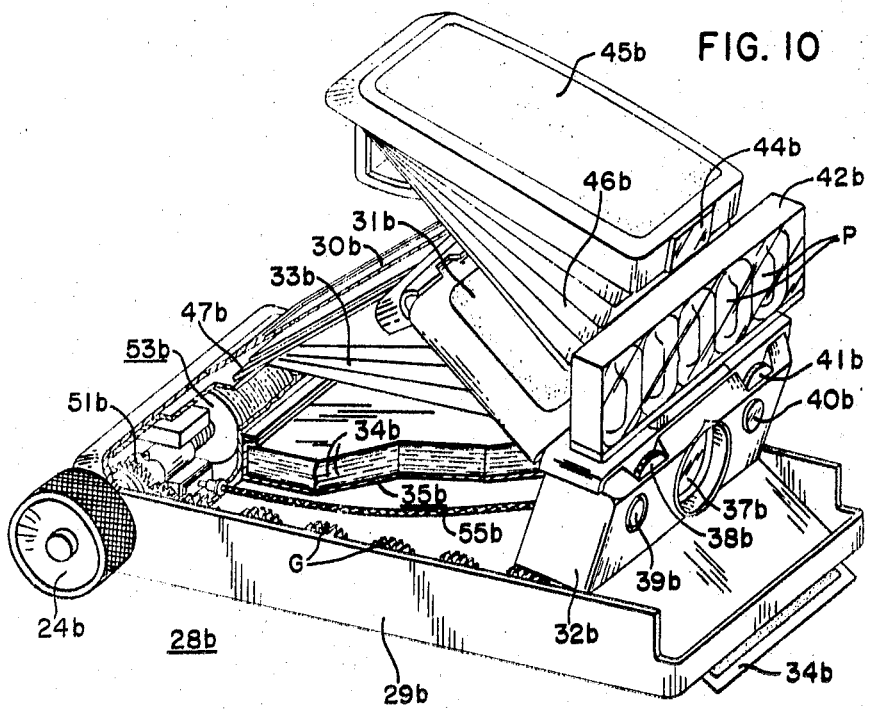
FIG. 10 is a perspective view of another modified "SX-70" Land type camera according to an alternative embodiment.

The invention is not limited to a camera having all of the automatic exposure-control components heretofore described but can be employed in conjunction with other modified versions of the "SX-70" Land camera to provide a family of cameras having different features and selling prices. In FIG. 10 there is the first of such alternative camera embodiments. Camera 28b has all of the features of the previously-described camera 28 except the automatic shutter-speed control component. Thus, camera 28b includes a collapsible housing having a base portion 29b, hinged panels 30b, exposure-control casing 32b, cap 45b, mirror 47b, and connecting bellows 33b and 46b. It also has a "Flash-Bar" flashlamp unit 42b and contains a magnetic flux generator 53b that is cocked by a control knob 24b and tripped by button 39b and a cable 55b. Knob 24b rotates drive gear 51b and gear train G as above-describeded. Camera 28b and gear also has a focusing control knob 38b, light cell 40b and a light-darken control knob 41b as previously described. The shutter mechanism, however, is of the fixed speed type and cooperates with the "f" stop control and electronic control components to properly expose film units 34b in cassette 35b.

Figure 11:
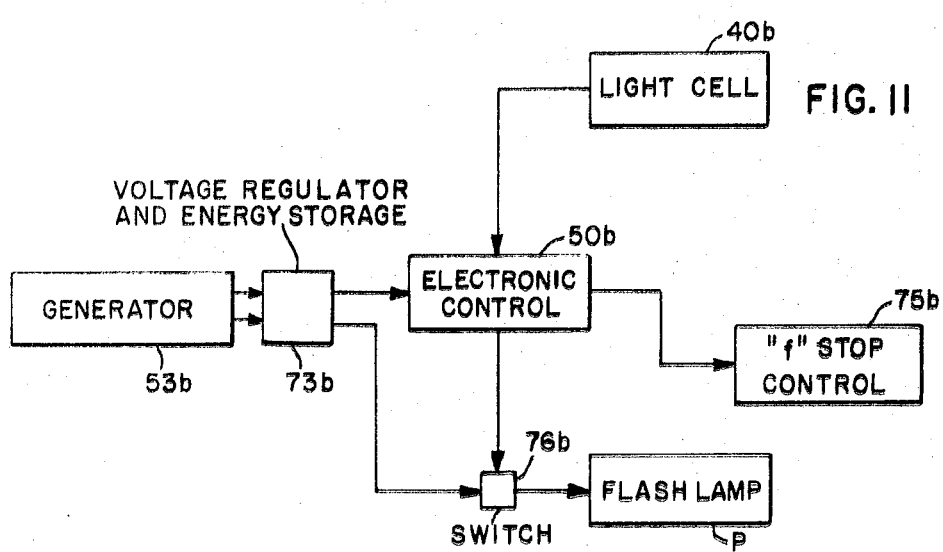
FIG. 11 is a block diagram of the various electrical components of the camera shown in FIG. 10 and the manner in which they are connected and energized.

As shown in FIG. 11, the electric circuit of the camera 28b consists of the magnetic flux generator 53b, the voltage regulator and energy storage component 73b, the electronic control component 50b, the light cell 40b, the "f" stop control component 75b, switch 76b and the flashlamp P.

Figure 12:
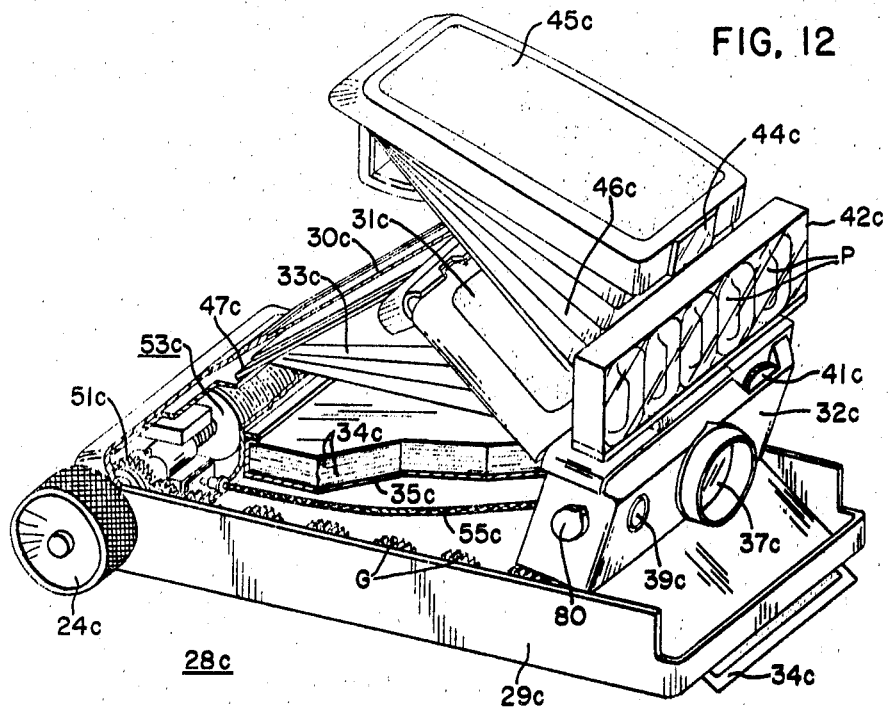
FIG. 12 is a pictorial view of still another modified "SX-70" Land type camera embodiment.

Another less expensive camera embodiment 28c is shown in FIG. 12. According to this embodiment, a simplified manually-operated or fixed-focus lens 37c of conventional design is employed along with a shutter mechanism which also has a fixed speed and manual (or fixed) "f" stop control. The solid-state electronic control component is also omitted so that the camera consitutes an "economy" model. In the absence of the electronic control component, the photoflash lamp P in the "FlashBar" unit 42c has to be selected manually for firing and is connected directly to the flash-switch. That is, no voltage regulator-energy storage circuit is used. This is achieved with a control knob 80 that is mounted on the lens housing 32c and is coupled by suitable mechanical linkage means and a movable contactor (not shown) that switches the electrical output of the magnetic flux generator 53c to the terminals on the "FlashBar" unit 42c that connect with the next unfired flashlamp P.

Figure 13:
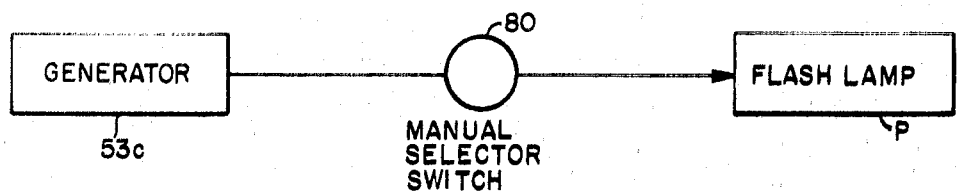
FIG. 13 is a block diagram of the electrical components and circuit employed in the camera shown in FIG. 12.

The simplified electrical circuit employed in camera 28c is shown in FIG. 13. As will be noted, the output of generator 53c is controlled by the manual selector switch 80 which delivers it to the proper flashlamp P of the multiflash unit when flash pictures are being taken.

Figure 14:
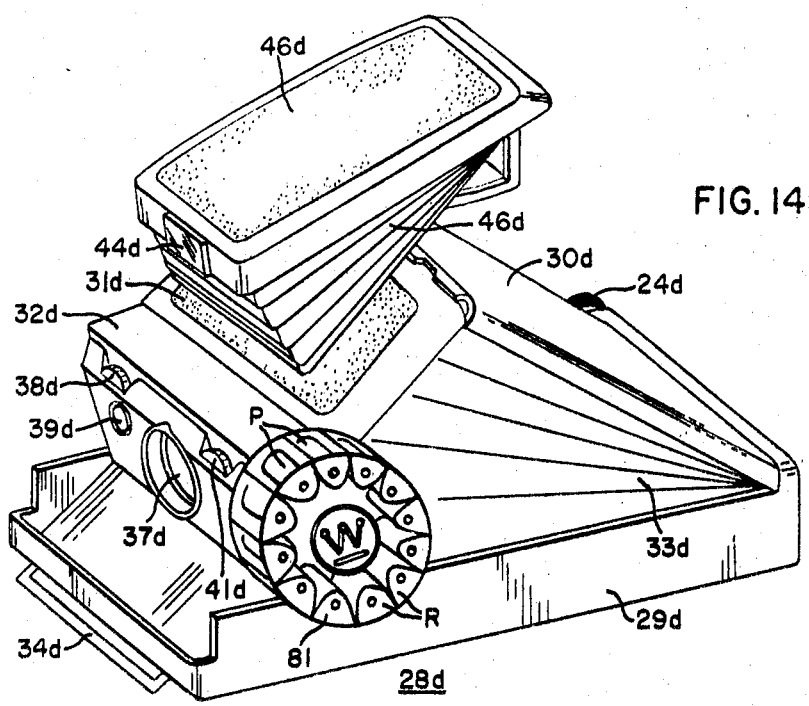
FIGS. 14 and 15 are similar pictorial views of two additional modified "SX-70" Land type camera embodiments that are fitted with a 12-lamp circular flash unit and a conventional flashcube, respectively.

The invention is also not limited to collapsible instant-photographic "SX-70" Land type cameras that are designed to employ "FlashBar" units which have 10 flash-lamps but may be used with multiflash units of various kinds. For example, in FIG. 14 there is shown a modified "SX-70" Land camera 28d that contains a magnetic-flux generator (not shown) and has the various control knobs 38d, 41d and components described previously in connection with the other cameras. However, camera 28d is fitted with a compact multiflash unit 81 of circular shape that is inserted into a suitable socket on the side of housing 32d and contains 12 miniature photoflash lamps P, each of which have their own reflector element R. The circular flashlamp unit 81 is rotated 30° each time the camera 28d is indexed through one complete cycle of operations. This can be accomplished by suitable internal gearing and a rotatable socket (not shown) in a manner similar to that disclosed in the "Instamatic" type camera described in the aforementioned concurrently-filed application Ser. No. 380,180.

A circular multiflash lamp unit having the aforesaid features is described in the concurrently-filed application Ser. No. 380,181 referred to previously.

Figure 15:
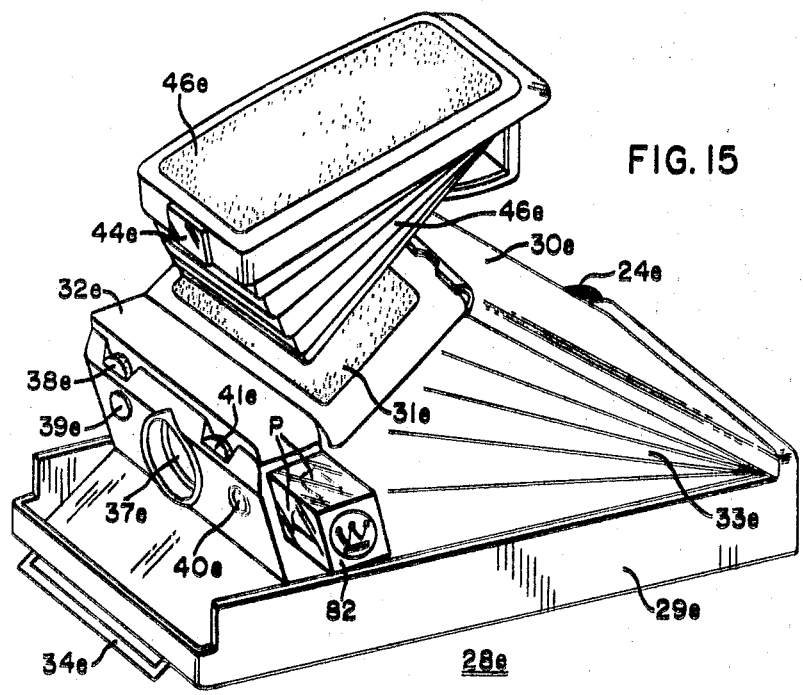

Another modified "SX-70" Land camara is shown in FIG. 15. According to this embodiment, a conventional flashcube 82 is inserted into the exposure-control housing 32e of the camera 28e. The flashcube 82 contains four photoflash lamps P and is rotated 90° each time the camera is indexed through one cycle. This is achieved by a conventional rotatable flashcube socket and internal gearing (not shown) or other suitable means that is coupled to the film-advancing and generator-locking knob 24e.

We claim as our invention:

1. In combination with a photographic camera having one or more associated devices that are electrically-operated and a shutter mechanism that is controlled by actuating means located on an exterior part of the camera, means within said camera for producing electrical energy and operating said associated device or devices comprising;

an electric generator comprising a permanent magnet and a pole piece that are movable relative to one another and constitute parts of a magnetic circuit, an armature that is movable toward and away from said pole piece and constitutes part of said magnetic circuit, and a wire coil disposed in inductive relationship with said magnetic circuit and oriented to generate a voltage pulse in response to changes in the flux density of the magnetic circuit produced by the movement of said armature relative to said pole piece, said armature being magnetically attracted to said pole piece and in captured relationship therewith when the generator is ready for use, means coupled to said shutter-actuating means and operative to move said magnet and pole piece relative to one another a sufficient distance to effect a concomitant decrease in the field strength of the magnetic circuit when the shutter-actuating means is operated, means for controllably storing mechanical energy and, in response to the operation of said shutter-actuating means and the resulting decrease in the magnetic field strength, converting said stored mechanical energy into kinetic energy which overcomes the weakened magnetic attractive force on said armature and rapidly shifts the position of the armature relative to the pole piece and thereby causes said wire coil to generate a voltage pulse, and electric circuit means connected to said wire coil for delivering the generated voltage pulse to the electrical device that is associated with the camera.

2. The combination of claim 1 wherein said mechanical-energy storage means comprises a spring that armature, and is retained in tensioned condition by the armature and pole piece when said armature is in magnetically-captured relationship with said pole piece.

3. The combination of claim 1 wherein;

said armature, when magnetically captured, is in contact with said pole piece, and said armature, magnet and wire coil are held in operative relationship with one another by means that limits the movement of the armature away from said pole piece.

4. The combination of claim 1 wherein;

said pole piece, armature and magnet are held in operative relationship by a metal casing that consitutes part of said magnetic circuit, and said mechanical-energy storage means comprises a coil spring.

5. The combination of claim 1 wherein;

said pole piece is secured to a stationary part of the camera structure, and said magnet is coupled to said shutter-actuating means and movable with respect to the pole piece.

6. The combination of claim 1 wherein;

said camera is of the collapsible instant-photographic type and has a base portion that accommodates a film cassette which contains a plurality of stacked filmunits, and said electric generator is also located in said base portion.

7. The combination of claim 6 wherein;

said base portion also contains a gear train and coupled film-indexing means that advances an exposed filmunit from a loaded film cassette to and through a pair of processing rollers, said mechanical-energy storage means comprises a spring that is placed in tensioned condition by the armature when the latter is moved into magnetically-captured relationship with said pole piece and is thus cocked, a cam is movably mounted within said base portion adjacent the armature, means for actuating said cam is secured to and extends beyond said base portion, and said armature is returned to cocked position against the action of the spring by said cam when the latter is moved by the cam-actuating means.

8. The combination of claim 7 wherein;

said cam-actuating means comprises a rotatable knob; and said gear train is coupled to said knob by a drive gear.

9. The combination of claim 6 wherein;

said pole piece is secured to a stationary part of said base portion, and said magnet is coupled to the shutter-actuating means and movable with respect to the pole piece.

10. The combination of claim 9 wherein;

said shutter-actuating means comprises a push-button, and said magnet is coupled to the push-button by a cable.

11. The combination of claim 6 wherein;

said shutter-actuating means comprises a pushbutton that is disposed on a housing which is hinged to the base portion of the camera, and said housing also encloses the lens and shutter components of the camera.

12. The combination of claim 11 wherein;

the associated electrically-operated device comprises an "f" stop control means that is disposed in said housing and coupled to said shutter component, said "f" stop control means is actuated by an electronic control means located in said base portion, and the voltage pulse produced by said electric generator is delivered to the electronic control means through a voltage regulator and energy storage means.

13. The combination of claim 12 wherein;

said camera includes means for controlling the shutter speed, and said shutter-speed control means is also located within said housing and actuated by the electronic control means.

14. The combination of claim 12 wherein;

the associated electrically-operated device comprises a photoflash lamp, and said housing includes socket means for mounting a photoflash lamp on the camera and connecting said lamp to said electric circuit means.

15. The combination of claim 14 wherein;

said base portion includes means for moving an exposed film unit from a loaded film cassette out of the camera, said photoflash lamp is disposed within a protective enclosure together with a plurality of other photoflash lamps and thus constitutes part of a multiflash unit that has a base portion, said socket means is rotatable and structured to engage said base portion and releasably hold the multiflash unit in operative positon on the camera, and said film-moving means is coupled to the rotatable socket means and indexes a different photoflash lamp into firing position on the camera when the film-moving means is operated through one complete cycle.

16. The combination of claim 15 wherein said multiflash unit comprises a flashcube.

17. The combination of claim 15 wherein;

said multiflash unit contains twelve photoflash lamps arranged in circular side-by-side array, and said socket means is coupled to the film-moving means by means which indexes the socket means through an angle of 30° each time the film moving means is operated through one cycle.

18. The combination of claim 14 wherein;

said photoflash lamp is disposed within a protective enclosure together with a plurality of other photoflash lamps and thus constitutes part of a multiflash unit that has a base portion, said photoflash lamps are arranged side-by-side in two rows, said socket means is stationary and has contacts which establish electrical connection with each of the lamps in one row when the base portion of said multiflash unit is inserted into said socket means, and said electronic control means includes sensor means which detects the unfired photoflash lamps in the inserted multiflash unit and sequentially connects them to said electric circuit means.

* * * * *

UNITED STATES PATENT OFFICE
CERTIFICATE OF CORRECTION

Patent No. 3,840,297     Dated October 8, 1974

Inventor(s) William E. Shoupp

It is certified that error appears in the above-identified patent and that said Letters Patent are hereby corrected as shown below:

On the cover sheet insert -- [73] Assignee:

Westinghouse Electric Corporation, Pittsburgh, Pa.

Signed and sealed this 31st day of December 1974.

(SEAL)
Attest:

McCOY M. GIBSON JR.      C. MARSHALL DANN
Attesting Officer     Commissioner of Patents